United States Patent [19]
Woodward

[11] 3,809,191
[45] May 7, 1974

[54] AUXILIARY BRAKING SYSTEM
[75] Inventor: Herber Jay Woodward, Salt Lake City, Utah
[73] Assignee: Index Industries, Inc., Salt Lake City, Utah
[22] Filed: Aug. 25, 1971
[21] Appl. No.: 174,756

Related U.S. Application Data
[63] Continuation-in-part of Ser. No. 847,278, Aug. 4, 1969, Pat. No. 3,613,356.

[52] U.S. Cl............. 188/106 A, 60/6, 74/89.14, 74/520, 92/75, 188/106 P, 188/162, 192/83
[51] Int. Cl.............................................. F16d 65/36
[58] Field of Search......... 188/106 R, 106 P, 106 F, 188/106 A, 158, 162, 364; 60/6, 54.6 M; 92/50, 69, 75; 192/83; 74/89.13, 89.15, 89, 520

[56] References Cited
UNITED STATES PATENTS

| | | | |
|---|---|---|---|
| 1,968,584 | 7/1934 | Apple | 188/106 A X |
| 2,140,741 | 12/1938 | Goepfrich | 188/106 A X |
| 2,155,030 | 4/1939 | Wilkins | 188/106 P |
| 2,660,026 | 11/1953 | Geyer | 60/6 |
| 2,757,554 | 8/1956 | Niedhammer, Jr. et al. | 74/520 |
| 2,871,827 | 2/1959 | Euga | 188/106 F X |
| 2,481,144 | 9/1949 | Neale | 188/364 X |

*Primary Examiner*—George E. A. Halvosa
*Attorney, Agent, or Firm*—Lynn G. Foster

[57] ABSTRACT

Electromechanical auxiliary braking systems are provided to supplement hydraulic braking systems. A reversible electric motor drives means for mechanically urging the brake shoes into or out of engagement with the brake drum. In some forms of the present invention, the mechanical means are located within the hydraulic cylinder of the hydraulic brake system and act upon the pistons thereof, while in other forms, the electromechanical system is completely independent of the hydraulic system and acts directly on the brake shoes.

1 Claim, 13 Drawing Figures

AUXILIARY BRAKING SYSTEM

This application is a continuation-in-part of my copending U.S. Pat. application, Ser. No. 847,278, filed Aug. 4, 1969, now U.S. Pat. No. 3,613,356.

BACKGROUND

1. Field of the Invention

The present invention relates to braking systems and more particularly to methods and apparatus for setting or applying hydraulic brakes in the event of failure of fluid pressure.

2. The Prior Art

Commonly, vehicles use air or hydraulic braking systems. Normally the successful operation of the braking systems is dependent upon the existence of fluid subjected to high pressure. Usually the existence of the pressurized fluid can be detected when the vehicle is running and under full control of the operator. However, when the vehicle is stopped or parked, and when the vehicle is unattended by an operator, failure of the brakes due to leakage of fluid or failure of pressurizing structure cannot be readily detected. Thus, the brakes of parked vehicles are frequently inadvertently released and, if the vehicle was parked on an incline or decline, the vehicle may become a "runaway" and incur much damage.

Auxiliary and emergency braking apparatus are well known in the art and generally include cables or other devices which have proved to be either undependable or highly complex and expensive.

BRIEF SUMMARY AND OBJECTS OF THE INVENTION

The present invention, comprises novel methods and apparatus, the apparatus being selectively actuated to positively apply vehicle brakes independent of the existence of pressurized fluid. Also, a warning system is provided to warn a vehicle operator when the amount of actuating fluid is low.

It is a primary object of the present invention to provide novel brake applying apparatus and methods.

One still further significant object of the present invention is to provide improved auxiliary braking structure and method for use with hydraulic brakes.

Another and no less important object of the present invention is to provide novel auxiliary braking structures and method for use with hydraulic brakes and which will be operative despite failure of the hydraulic system.

These and other objects and features of the present invention will become more fully apparent from the following description and appended claims taken in conjunction with the accompanying drawings wherein:

DETAILED DESCRIPTION OF THE ILLUSTRATED EMBODIMENTS

Figure 1:
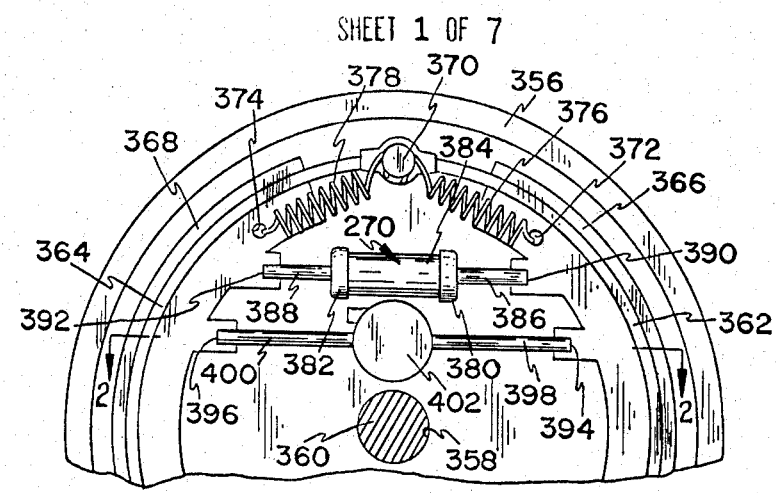
FIG. 1 is a fragmentary side elevational view of hydraulic braking structure and a preferred embodiment of the invention used therewith.
Figure 2:
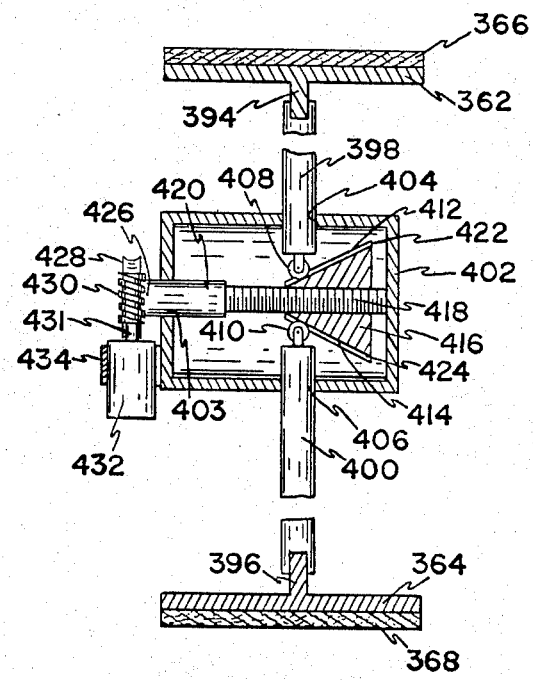
FIG. 2 is a horizontal cross section taken on the line 2—2 of FIG. 1.

Reference is now made to FIGS. 1 and 2 which illustrate a preferred embodiment of the invention having application to hydraulic brakes. Referring particularly to FIG. 1, a conventional hydraulic brake system is shown along with the novel improvement comprising the present invention. Conventionally, a backing plate 356 is rigidly mounted upon an axle housing (not shown) and is provided with an aperture 358 through which an axle 360 is disposed. A pair of opposed brake shoes 362 and 364, having brake linings 366 and 368, respectively, are pivotally coupled to an outwardly projecting pin 370 which is rigidly mounted upon the backing plate 356. Each of the brake shoes 362 and 364 has an aperture 372 or 374 into which brake springs 376 and 378 are attached. Brake springs 376 and 378 are also looped over the pin 370 so that the brake shoes 362 and 364 are continuously biased inwardly.

Figure 5:
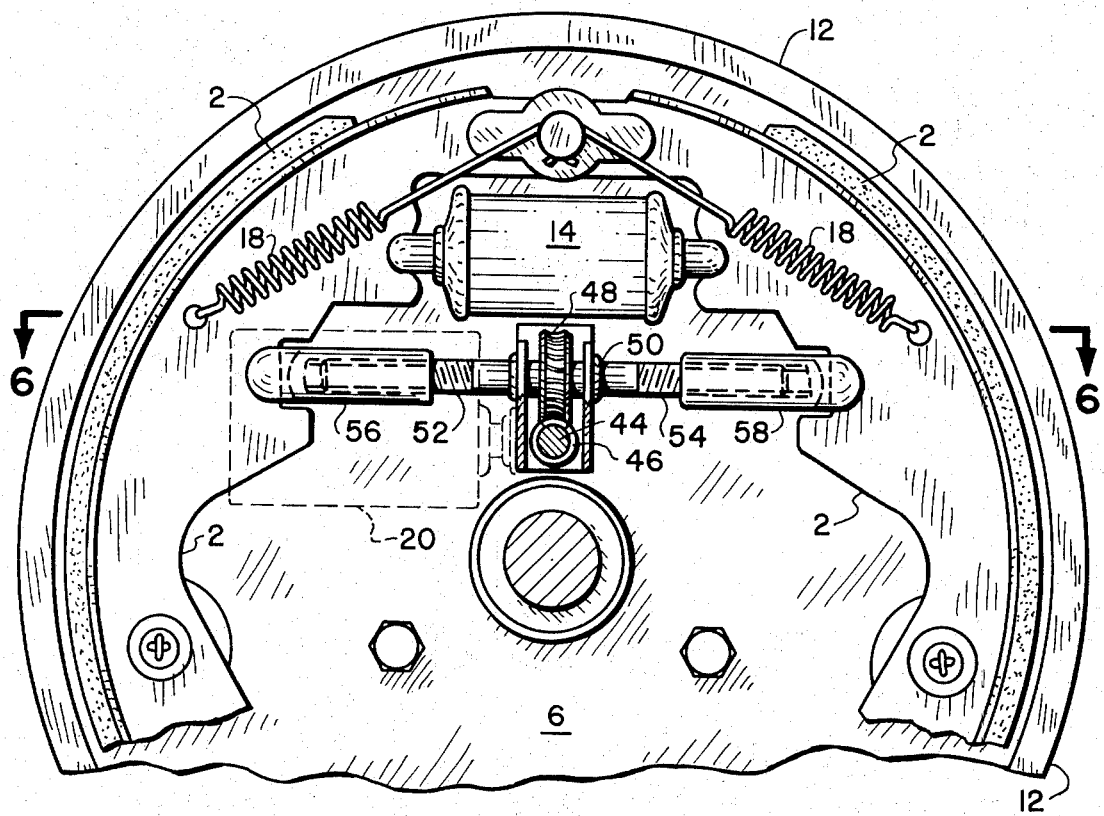
FIG. 5 is a side elevational view of the hydraulic braking structure of FIG. 1 and an additional alternative embodiment of the invention used therewith.

Hydraulic brake applying mechanism 270 is mounted upon the backing plate 356 between the shoes 362 and 364. Conventionally, the hydraulic brake mechanism 270 comprises pistons (not shown) which are outwardly displaced in response to the communication of hydraulic fluid under pressure from hydraulic fluid line 268 (FIG. 5). The mechanism 270 has rubber caps 380 and 382 disposed on either end of piston containing cylinder 384. Rods 386 and 388 are displaced by the outwardly moving pistons against coupling fingers 390 and 392.

Conventionally, when hydraulic fluid is forced into cylinder 270, the rods 386 and 388 displace the brake shoes 362 and 364 outwardly into contact with a brake drum (not shown) whereby friction is exerted to stop a moving vehicle.

According to the presently preferred embodiment of the invention, brake shoes 362 and 364 are preferably fashioned with additional coupling fingers 394 and 396. Coupling fingers 394 and 396 are pivotally attached to axially displaceable rods 398 and 400. Rods 398 and 400 are communicated to the interior of a cylindrical housing 402 (FIG. 2) through apertures 404 and 406, respectively. Housing 402 is preferably rigidly mounted upon the backing plate 356. Apertures 404 and 406 are disposed in the curved surface of cylinder 402 and are directed essentially normal to the axis of the cylinder 402.

As best shown in FIG. 2, rods 398 and 400 are provided with rotatable bearing wheels 408 and 410 which are rotatably carried upon the ends of rods 398 and 400, respectively.

Bearing wheels 408 and 410 are normally disposed upon ramp surfaces 412 and 414, respectively, of a conically configured nut 416. Nut 416 is threadedly surmounted upon the threaded portion 418 of a shaft 420. Although nut 416 is axially displaceable along the threaded portion 418, rotation of the nut 416 relative to the conical housing 402 is prevented. Although rotation of the nut 416 may be prevented in any suitable way, it is presently preferred that the ramp surfaces 412 and 414 be disposed in recesses having upstanding sides 422 and 424. The sides 422 and 424 abut the sides of bearing wheels 408 and 410 to prevent the conical nut 416 from rotating relative to the housing 402.

The shaft 420 is preferably journaled into the housing 402 as at 403 so as to be easily rotatable therein. If desired, bearings (not shown) may be interposed between the shaft 420 and the housing 402 to minimize the friction which may be developed therebetween.

The terminal end 426 of shaft 420 is exposed exterior of the housing 402 through aperture 403 and is integrally united to a worm gear 428. Worm gear 428 meshes with a worm 430 which is non-rotatably secured to the armature or output shaft 431 of an electric motor 432. The electric motor 432 is preferably reversible and, if desired, may be essentially identical to the motor 70 described in connection with FIGS. 1–4 above. If desired, the motor 432 may be mounted upon a bracket 434 disposed between the housing 402 and the backing plate 356. Alternatively, the motor 432 may be disposed on the reverse side (not shown) of the backing plate 356 so that shaft 420 projects through both the housing 402 and the backing plate 356.

As can be appreciated particularly from reference to FIG. 2, as the motor 432 is energized, shaft 420 will rotate so that nut 416 will advance toward the left as viewed in FIG. 2. Bearing wheels 408 and 410 will progress up the ramp surfaces 412 and 414 so that rods 398 and 400 are respectively forced apart. Outward displacement of the rods 398 and 400 results in engagement of the linings 366 and 368 of the brake shoes 362 and 364, respectively, with the brake drum (not shown) causing a moving vehicle to stop. When the direction of the motor 432 is reversed, the mentioned steps are serially reversed so that the bearing wheels 408 and 410 progress down the ramp surfaces 412 and 414, respectively, to allow the brake linings 366 and 368 to move out of contact with the brake drum.

Figure 3:
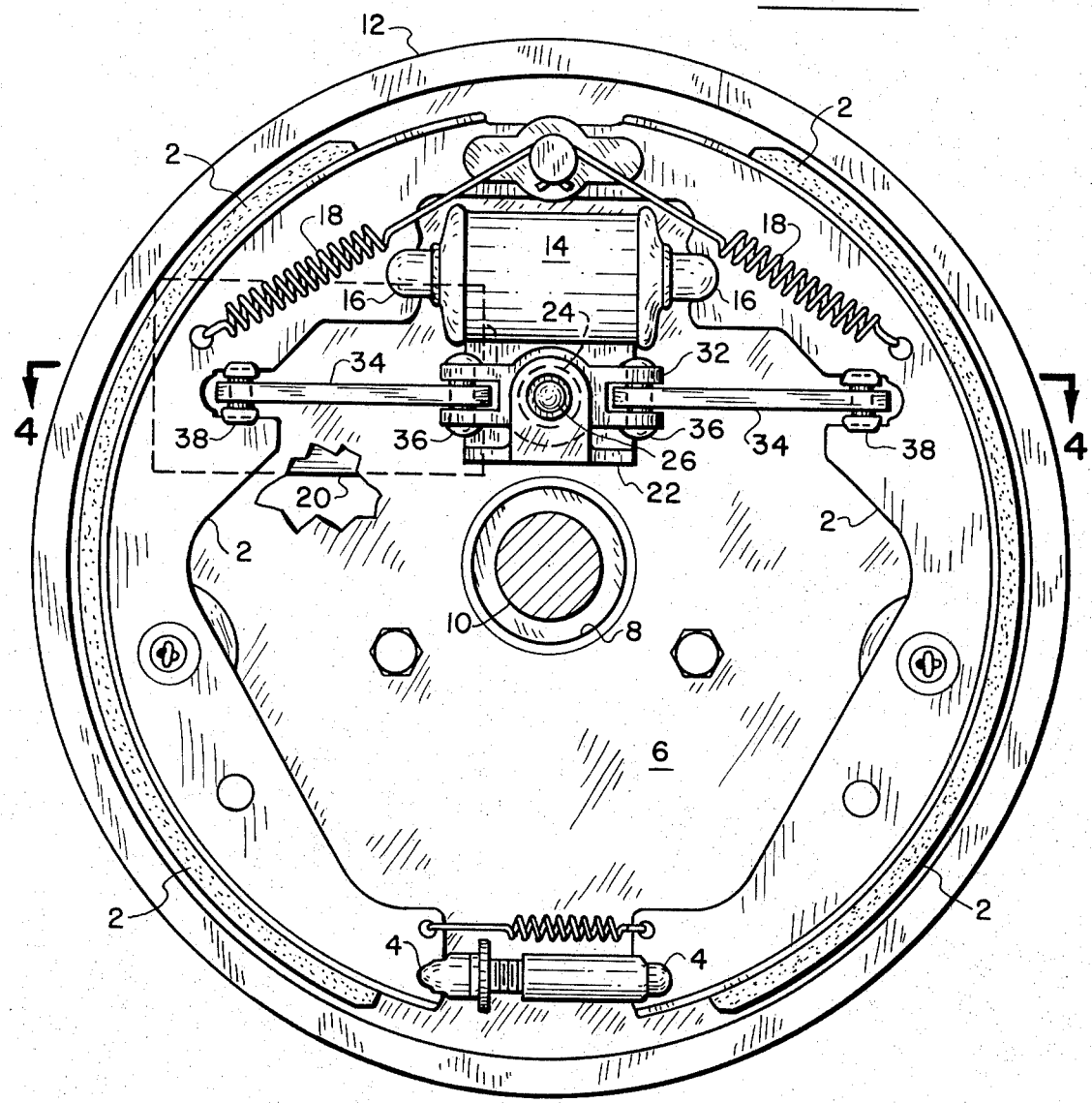
FIG 3 is a side elevational view of the hydraulic braking structure of FIG. 1 and an alternative embodiment of the invention used therewith.
Figure 4:
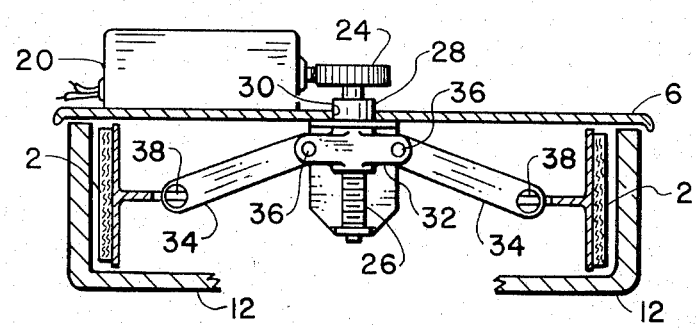
FIG. 4 is a horizontal cross section taken on the lines 4—4 of FIG. 3.

Reference is now made to FIGS. 3 and 4 which illustrate an alternative embodiment of the present invention. As shown, a conventional hydraulic braking system comprises a pair of brake shoes 2 pivotally secured, as indicated at 4, to a plate 6 having a central aperture 8 through which passes an axle 10. The axle 10 carries a wheel, not shown, on which is mounted an annular brake drum 12 which extends closely about the brake shoes 2. The brake shoes 2 are normally movable into engagement with the drum 12 by hydraulic cylinder 14 acting through piston rods 16 to apply the brake and are moved out of engagement with drum 12 by springs 18 when the brake is released. In the event of failure of the hydraulic system, a reversible electric motor 20 is mounted on the plate 6 and is energized by suitable means, such as the battery of the automobile. The motor 20 may be actuated by a manual switch mounted on the dashboard of the automobile or by a pressure-responsive switch connected in the hydraulic system and operable in response to lack of adequate pressure in the hydraulic system. The motor 20 rotates a worm 22 which drives a gear 24 which, in turn, rotates a threaded shaft 26. The shaft 26 projects perpendicularly from the center of gear 24 and extends, through a bushing 28 in aperture 30 of plate 6, into the area between the brake shoes 2. An internally threaded nut 32 is carried by the shaft 26 and a pair of drive rods 34 each having one end thereof pivotally connected to the nut 32, as seen at 36, while the opposite ends thereof are pivotally secured to the respective brake shoes 2, as seen at 38.

In operation, when motor 20 is actuated, it acts, through worm 22 and gear 24, to rotate shaft 26, causing nut 32 to travel outwardly from plate 6 along shaft 26. As this occurs, nut 32 carries the inner ends of drive rods 34 outwardly and causes the drive rods 34 to force brake shoes 2 outwardly into engagement with brake drum 12, thereby applying the brake. To release the brake, motor 20 is reversed. This rotates worm 22, gear 24 and shaft 26 in the opposite direction, causing nut 32 to travel inwardly toward plate 6 along shaft 26. This releases the pressure applied by drive rods 34 and allows springs 18 to move the brake shoes 2 out of engagement with drum 12.

Figure 6:
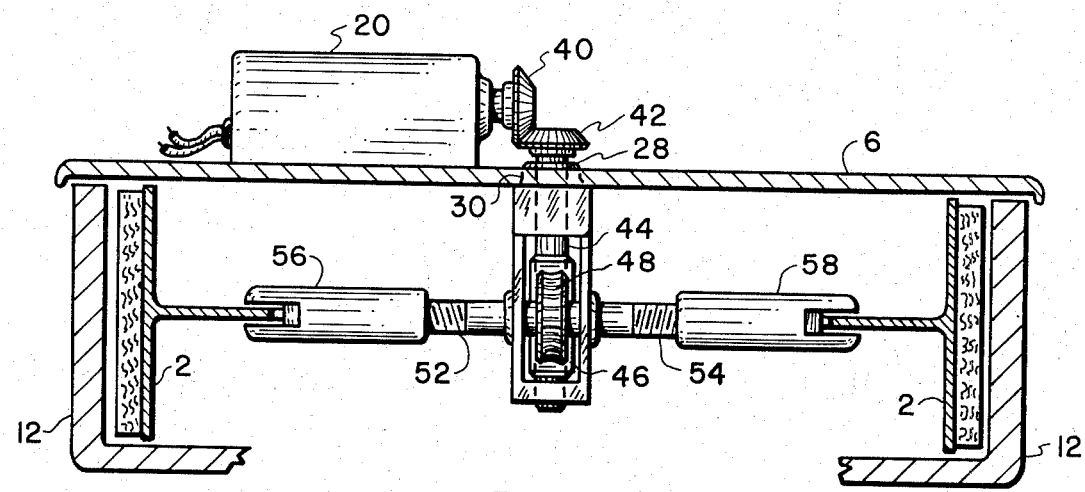
FIG. 6 is a horizontal cross section taken on the line 6—6 of FIG. 5.

Reference is now made to FIGS. 5 and 6 which illustrate another alternative embodiment of the present invention. In this form of the invention, the reversible electric motor 20 rotates a level gear 40 which drivingly engages a second lever gear 42 mounted on one end of a shaft 44. The shaft 44 extends through bushing 28 in aperture 30 of plate 8 and carries a worm 46 at its opposite end. Worm 46 engages a gear 48 mounted centrally of a shaft 50 which is provided with oppositely threaded end portions 52 and 54. A pair of internally threaded clevis pins 56 and 58 each mate with a respective one of the threaded portions 52 and 54 of shaft 50 and have their opposite ends connected to the brake shoes 2, as seen at 60.

In operation, when motor 20 is actuated, it serves to rotate gears 40 and 42, shaft 44, worm 46, and gear 48 and, hence, shaft 50. This causes clevis pins 56 and 58 to be driven away from each other and to force the brake shoes 2 into engagement with drum 12 to apply the brake. To release the brake, motor 20 is reversed. This drives shaft 50 in the opposite direction, through gears 40 and 42, shaft 44, worm 46, and gear 48, and causes clevis pins 56 and 58 to be driven toward each other and, thereby, draw the brake shoes 2 out of engagement with drum 12.

Figure 7:
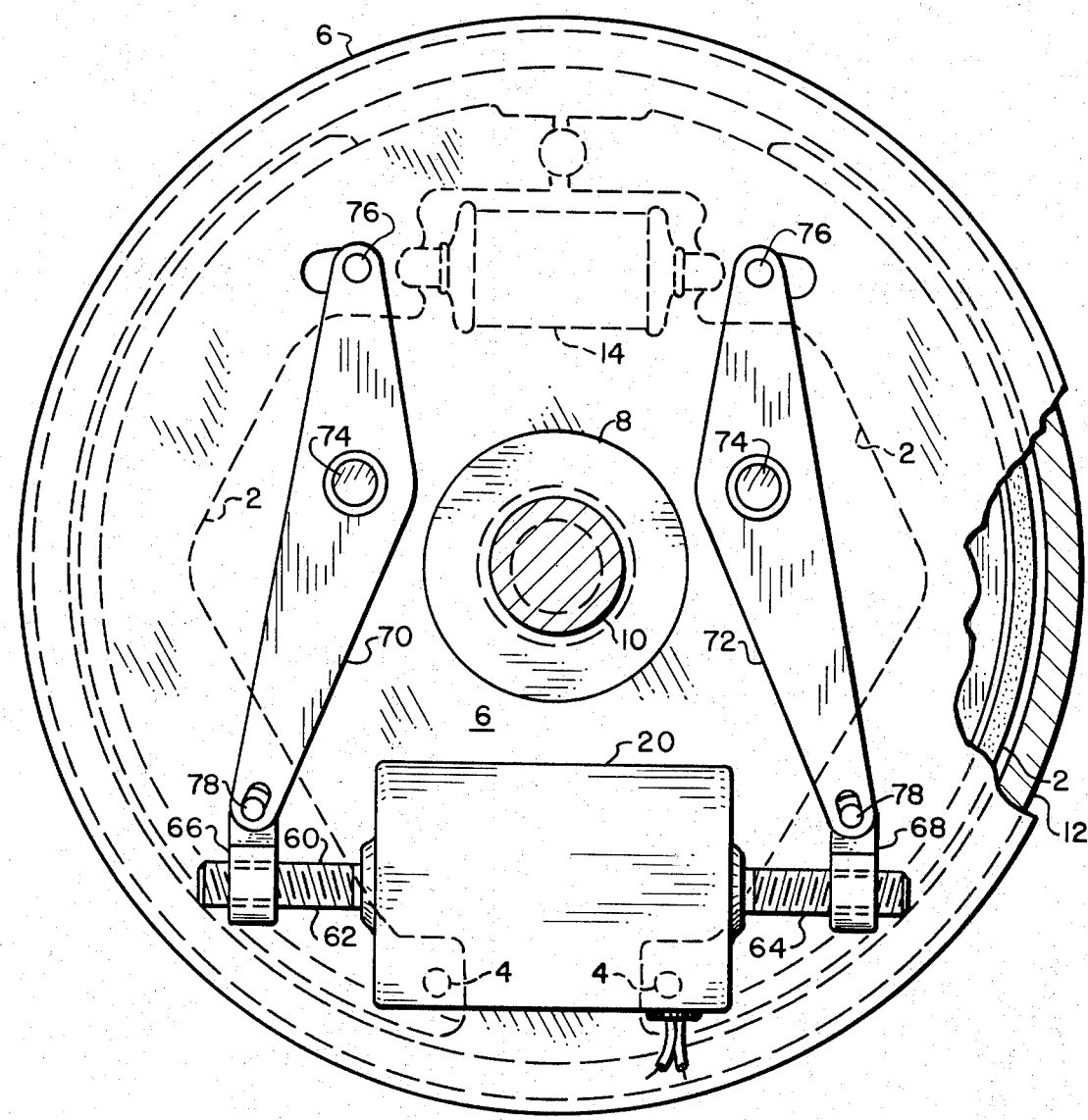
FIG. 7 is a side elevational view of the hydraulic braking structure of FIG. 1 and a further alternative embodiment of the invention used therewith.
Figure 9:
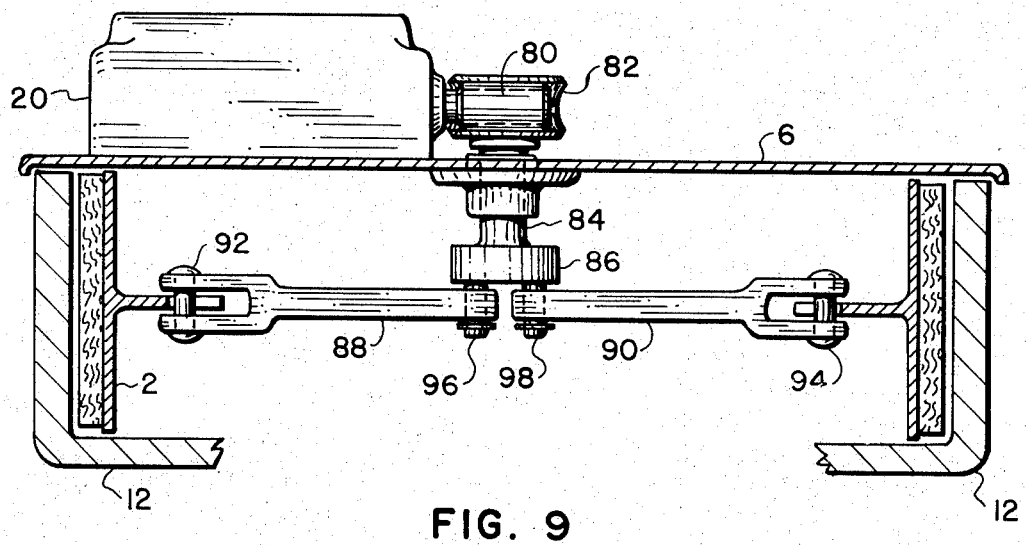
FIG. 9 is a horizontal section taken on the line 9—9 of FIG. 8.

Reference is now made to FIG. 7 which illustrates an additional alternative embodiment of the present invention. In this form of the invention, the reversible electric motor 20 is mounted on the front of plate 6 and serves to rotate a shaft 60 having oppositely threaded end portions 62 and 64. A pair of internally threaded nuts 66 and 68 are carried by the threaded portions 62 and 64, respectively, of shaft 60. A pair of generally L- shaped lever members 70 and 72 are pivotally secured to plate 6, as by pins 74, and each have one end 76 connected to the brake shoes 2 while the opposite ends are pivotally secured to respective ones of the nuts 64 and 66, as seen at 78.

In operation, when motor 20 is actuated, it serves to rotate shaft 60 which causes nuts 66 and 68 to be driven toward each other along the threaded portions 62 and 64 of shaft 60. This moves ends 78 of lever members 70 inwardly, causing the lever members 70 to pivot about pins 74 and forcing ends 76 outwardly to force brake shoes 2 to engage drum 12. To release the brake, motor 20 is reversed and causes shaft 60 to rotate in the opposite direction. This drives nuts 66 and 68 and ends 78 of lever members 70 away from each other and causes ends 76 of lever members 70 to be moved inwardly, thus, drawing brake shoes 2 out of engagement with drum 12.

Figure 8:
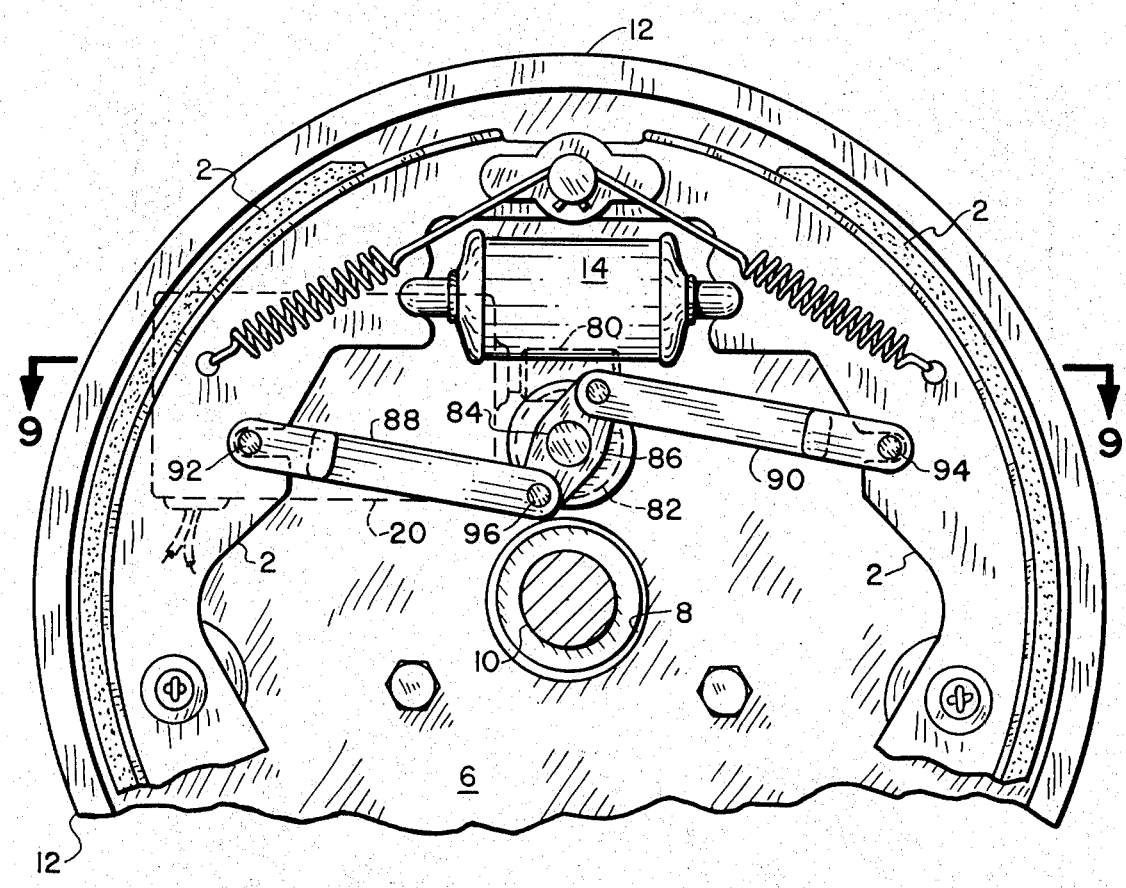
FIG. 8 is a side elevational view of the hydraulic braking structure of FIG. 1 and another alternative embodiment of the invention used therewith.

Reference is now made to FIG. 8 which illustrate a further alternative embodiment of the present invention. In this form of the invention, the motor 20 is mounted on the rear of plate 6 and rotates a worm 80 which drives a gear 82 mounted on the end of shaft 84. Shaft 84 extends through bushing 28 in aperture 30 of plate 6. A vertically extending rod 86 has its midpoint connected to the inner end of shaft 84. A pair of drive rods 88 and 90 each have one end thereof pivotally connected to the brake shoes 2, as seen at 92 and 94, respectively. Drive rod 88 has its opposite end pivotally connected to one end of rod 86, as seen at 96, while drive rod 90 has its opposite end pivotally connected to the opposite end of rod 86, as seen at 98.

In operation, when motor 20 is actuated, it rotates worm 80 which, in turn, rotates gear 82 and shaft 84. Rotation of shaft 84 rotates rod 86 and causes drive rods 88 and 90 to force brake shoes 2 into engagement with drum 12. To release the brake, motor 20 is reversed, this rotates worm 80, gear 82, shaft 84, and rod 86 in the opposite direction and causes drive rods 88 and 90 to draw brake shoes 2 out of engagement with drum 12.

Figure 10:
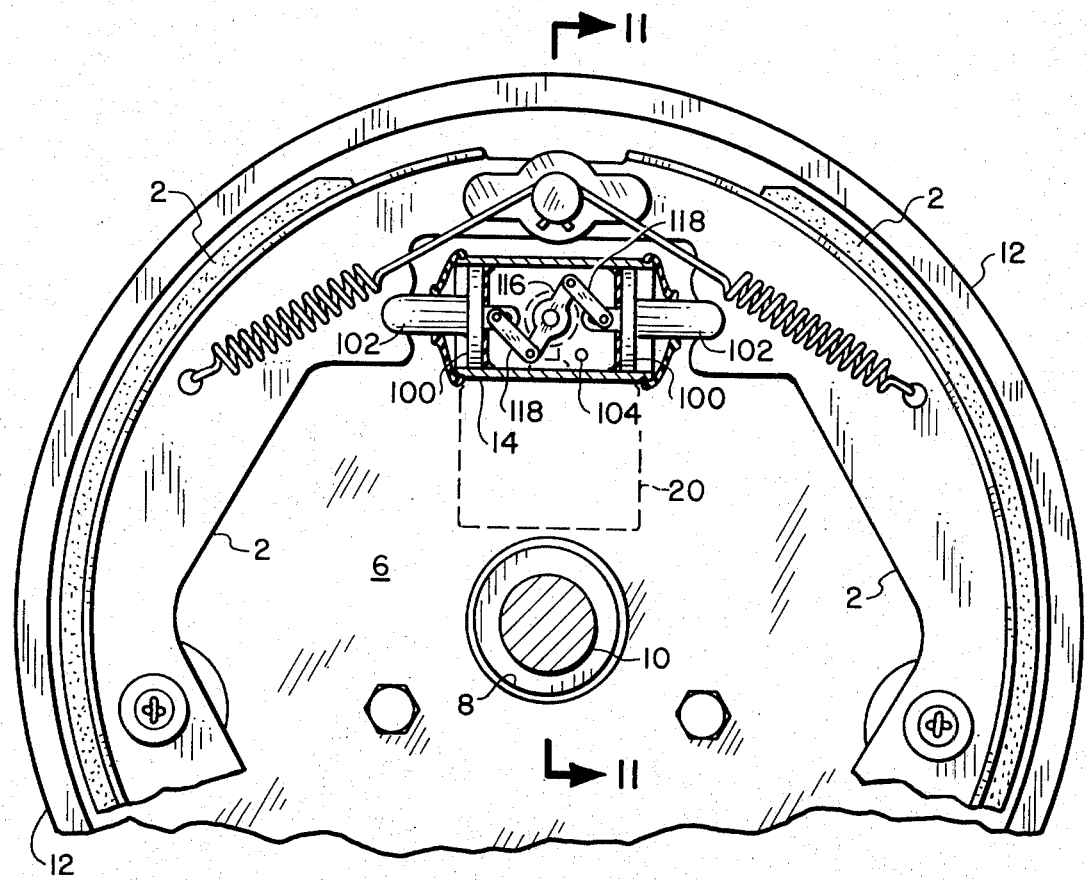
FIG. 10 is a side elevational view, with parts in section, of the hydraulic braking system of FIG. 1 and a further alternative embodiment of the invention used therewith.
Figure 11:
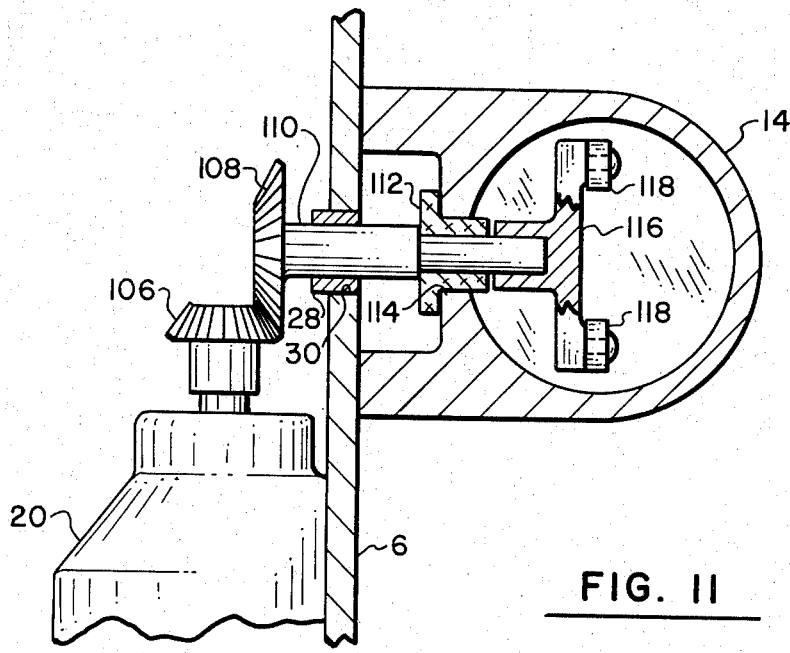
FIG. 11 is a transverse section taken on the line 10—10 of FIG. 10.

Reference is now made to FIGS. 10 and 11 which illustrate an additional embodiment of the present invention. In this form of the invention, the force of the auxiliary braking system is applied internally of the hydraulic cylinder 14 of the hydraulic braking system. As is well known, in a conventional hydraulic brake system, the hydraulic cylinder 14 is hollow and has a pair of pistons 100 movably disposed therein, each connected by piston rods 102 to a respective one of the brake shoes 2. A fluid port 104 is provided in the cylinder 14 intermediate the pistons 100. To actuate the brake, pressurized hydraulic fluid is introduced into cylinder 14 through port 104 and forces the pistons 100 outwardly, causing piston rods 102 to drive the brake shoes 2 into engagement with the drum 12. To release the brake, the fluid is vented from cylinder 14 through port 104 to a suitable reservoir, not shown, thereby reducing the pressure on the pistons 100. When this happens, springs 18 act to draw the brake shoes 2 out of engagement with drum 12 and, through piston rods 102, force the pistons 100 inwardly toward each other. In accordance with the present invention, a reversible electric motor 20 is mounted on the rear of the plate 6 and serves to rotate a level gear 106 which drivingly engages a second level gear 108 mounted on one end of a shaft 110. Shaft 110 passes through bushing 28 in aperture 30 of plate 6 and through a fluid seal 112 mounted in an aperture 114 formed in the hydraulic cylinder 14 and extends into the interior of hydraulic cylinder 14 intermediate the pistons 100. A vertical bar 116 has its midpoint secured to the shaft 110 and a pair of drive rods 118 each have one end thereof pivotally connected to a respective end of the vertical bar 116 and have their opposite end connected to a respective one of the pistons 100.

In operation, motor 20 is actuated and rotates gear 106 which, in turn, rotates gear 108 and shaft 110. Rotation of shaft 110 serves to rotate vertical bar 116 which causes drive rods 118 to drive the pistons 100 outwardly. This causes piston rods 102 to force the brake shoes 2 into engagement with brake drum 12. To release the brake, motor 20 is reversed. This causes gears 106 and 108, shaft 110, and bar 116 to rotate in the opposite direction and causes drive rods 118 to draw pistons 100 inwardly. This causes piston rods 102 to draw the brake shoes 2 out of engagement with the drum 12.

Figure 12:
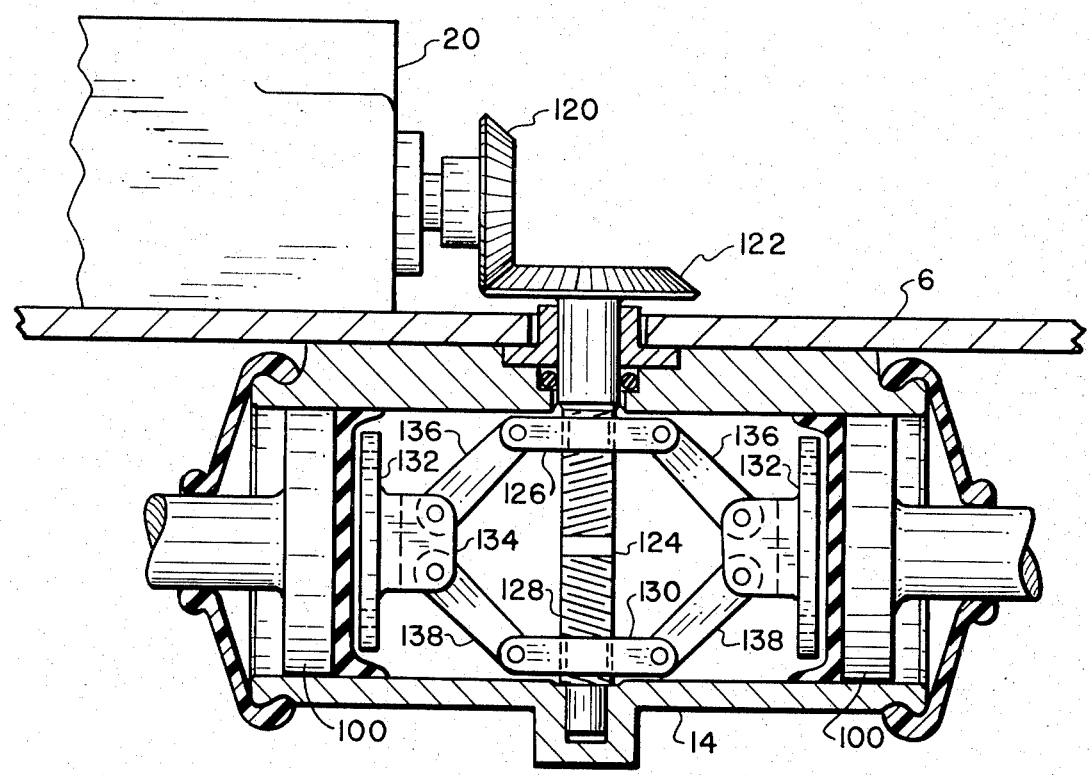
FIG. 12 is a side elevational view, with parts in section, of the hydraulic braking system of FIG. 1 and another alternative embodiment of the invention used therewith.
Figure 13:
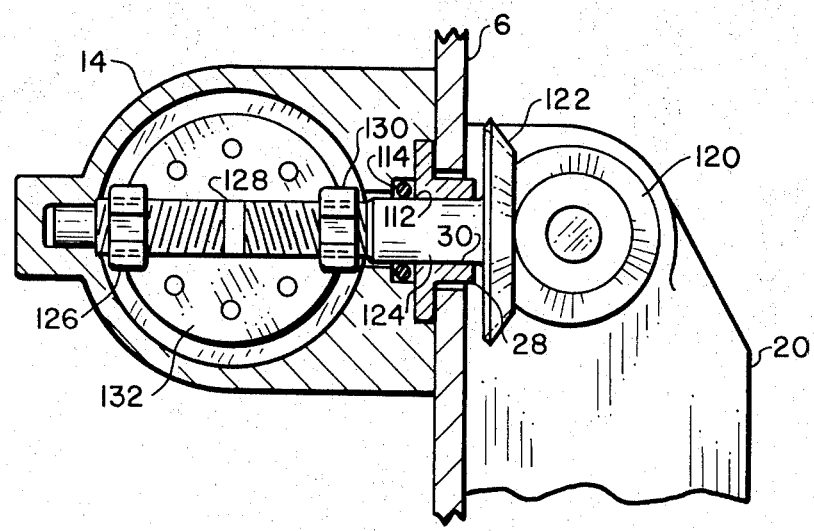
FIG. 13 is a vertical section taken on the line 13—13 of FIG. 12.

Reference is now made to FIG. 12 which illustrates a further embodiment of the present invention. In this form of the invention, reversible motor 20 is mounted on the rear of plate 10 and drives level gear 120 which drivingly engages gear 122. Gear 122 is mounted on one end of a shaft 124 which extends through bushing 28 in apertures 30 of plate 6 and fluid seal 112 in aperture 114 of hydraulic cylinder 14 and extends completely across the interior of hydraulic cylinder 14 and is received in a suitable journal 126. Within the hydraulic cylinder 14, shaft 124 is threaded as seen at 128, and a nut 130 is carried by shaft 124 and mates with the threads 128. A pair of actuator plates 132 having inwardly projecting studs 134 are provided within the hydraulic cylinder 14 interposed between shaft 124 and the hydraulic pistons 100. Preferably, the actuator plates 132 are perforated or otherwise formed to permit fluid passage therethrough. The studs 134 each have a pair of actuator rods 136 and 138 pivotally connected to the inner ends thereof. The opposite ends of actuator rods 136 are pivotally connected to the journal 126, while the opposite ends of actuator rods 138 are pivotally connected to nut 130.

In use, motor 20 is actuated and serves to rotate gear 120 which rotates gear 122 and shaft 124. Rotation of shaft 124 causes nut 130 to travel along threads 128 of shaft 124 toward journal 126 and causes actuator rods 136 and 138 to force the actuator plates 132 outwardly. The actuator plates 132 engage pistons 100 and drive pistons 100 outwardly causing piston rods 102 to force the brake shoes 2 into engagement with drum 12. To release the brake, motor 20 is reversed, which rotates gears 120 and 122 and shaft 124 in the opposite direction. This causes nut 130 to travel along threads 128 of shaft 124 away from journal 126 and causes actuator rods 136 and 138 to draw the actuator plates 132 inwardly away from pistons 100. This allows springs 18 to draw the brake shoes 2 inwardly out of engagement with brake drum 12 which causes piston rods 102 to drive pistons 100 inwardly in preparation for subsequent application of the brake.

Obviously, numerous variations and modifications may be made without departing from the present invention. Accordingly, it should be clearly understood that the forms of the present invention described above and shown in the accompanying drawing are illustrative only and are not intended to limit the scope of the present invention.

What is claimed is:

1. A dual actuation braking system comprising:

opposed brake shoes mounted for movement into and out of engagement with a circumscribing brake drum;

a hydraulic brake cylinder carried between the brake shoes within the brake drum and including opposed pistons hydraulically actuable by pressurized brake fluid applied to a central chamber within the hydraulic brake cylinder by means external thereof to the central chamber to drive said brake shoes into engagement with said drum;

resilient means for urging said brake shoes out of engagement with said drum;

an electric motor mounted adjacent the hydraulic brake cylinder;

an aperture formed in one side of said hydraulic cylinder at the central chamber and intermediate said pistons;

a shaft rotatably coupled to and driven by said motor projecting at a threaded end thereof through said aperture into the central chamber of said cylinder, a seal being interposed between the shaft and the cylinder at the aperture to constrain leakage of brake fluid from the central chamber; and mechanical means disposed within the central chamber of said cylinder in said brake fluid for movement therein in the presence of brake fluid independent of whether said brake fluid is under pressure or in the absence of fluid in said cylinder because of leakage or the like, said mechanical means being connected within the cylinder by an internally threaded nut to the threaded end of and actuated by said shaft by threaded movement of the nut along the shaft between first and second positions in response to the rotation of said motor, said mechanical means further comprising a pair of drive rods within the cylinder each having one end thereof connected to said nut and the other end thereof mounted to a plate means adjacent to a piston for driving engagement with a respective one of said brake shoes through the pistons, the length of said drive rods being such that, when said nut is moved from said first position to said second position, said drive rods serve to displace the pistons and force said brake shoes into engagement with said drum and hold said engagement until released by said motor.

* * * * *